United States Patent
Jalaliyazdi et al.

(10) Patent No.: US 12,195,007 B2
(45) Date of Patent: Jan. 14, 2025

(54) SYSTEMS AND METHODS FOR IMPROVING DRIVER MONITORING SYSTEMS

(71) Applicant: GM GLOBAL TECHNOLOGY OPERATIONS LLC, Detroit, MI (US)

(72) Inventors: Milad Jalaliyazdi, Richmond Hill (CA); Peitong Hu, Markham (CA); Parisa Mahvelatishamsabadi, North York (CA); Reza Zarringhalam, Whitby (CA); Kurt L. Fischer, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 239 days.

(21) Appl. No.: 18/058,895

(22) Filed: Nov. 28, 2022

(65) Prior Publication Data
US 2024/0174235 A1 May 30, 2024

(51) Int. Cl.
*B60W 40/08* (2012.01)
*B60W 10/30* (2006.01)
*B60W 50/14* (2020.01)

(52) U.S. Cl.
CPC ............ *B60W 40/08* (2013.01); *B60W 10/30* (2013.01); *B60W 50/14* (2013.01); *B60W 2420/403* (2013.01)

(58) Field of Classification Search
CPC ...... B60W 40/08; B60W 10/30; B60W 50/14; B60W 2420/403; G06V 20/597
See application file for complete search history.

(56) References Cited

U.S. PATENT DOCUMENTS

| 10,913,464 | B1* | 2/2021 | Qiao | B60W 50/14 |
| 2006/0082192 | A1* | 4/2006 | Dubay | B60J 7/0015 |
| | | | | 296/214 |
| 2018/0204079 | A1* | 7/2018 | Matsumura | B60K 28/066 |
| 2019/0272436 | A1* | 9/2019 | Kuehnle | G06Q 50/40 |

(Continued)

FOREIGN PATENT DOCUMENTS

| CN | 214215449 U | * | 9/2021 | |
| GB | 2558653 A | * | 7/2018 | B62D 1/105 |
| JP | 2018128974 A | * | 8/2018 | B60Q 9/00 |

(Continued)

OTHER PUBLICATIONS

Vincente et al.; Driver Gaze Tracking and Eyes Off the Road Detection System; IEEE Transactions on Intelligent Transportation Systems, vol. 16. No. 4, Aug. 2015; pp. 2014-2027 (Year: 2015).*

*Primary Examiner* — Michael J Zanelli
(74) *Attorney, Agent, or Firm* — Lorenz & Kopf LLP (57) ABSTRACT

Methods and systems are provided for improving a Driver Monitoring System (DMS) of a vehicle. The system includes a controller in operable communication with the DMS of the vehicle. The controller is configured to, by a processor: receive a signal from the DMS that a camera of the DMS is unable to monitor a driver of the vehicle, determine a cause of the camera being unable to monitor the driver, and adjust an escalation algorithm of the DMS based on the determined cause of the camera being unable to monitor the driver. The escalation algorithm is configured to perform actions based on activity of the driver.

20 Claims, 5 Drawing Sheets

(56) References Cited

U.S. PATENT DOCUMENTS

2020/0298677 A1* 9/2020 Katsura .................. E06B 9/24
2024/0208522 A1* 6/2024 Verma ................ B60W 40/09

FOREIGN PATENT DOCUMENTS

| JP | 2021018665 A | * | 2/2021 | |
|---|---|---|---|---|
| KR | 20210123497 A | * | 10/2021 | ........... G02F 1/1303 |
| WO | WO-2018163492 A1 | * | 9/2018 | ............. B60R 11/04 |
| WO | WO-2022230168 A1 | * | 11/2022 | |

* cited by examiner

SYSTEMS AND METHODS FOR IMPROVING DRIVER MONITORING SYSTEMS

INTRODUCTION

The technical field generally relates to direct driver monitoring systems (DMSs), and more particularly relates to systems and methods for improving a response of a DMS when the DMS is unable to assess a state of a driver.

Direct driver monitoring systems (DMSs) are vehicle safety systems that assess a driver's alertness while operating a vehicle. DMSs typically use a driver-facing camera equipped with infrared light-emitting diodes (LEDs) or lasers that allow the DMSs to observe the driver, including aspects such as eye movement, eye direction, head position, eye lid movement, etc. Based on these observations, the DMSs can determine and report an "attention state" of the driver, such as whether the driver is paying attention to the road and operation of the vehicle, or whether the driver is inattentive, distracted, or the like. The attention state of the driver may be used by the DMSs directly (e.g., to regain the driver's attention via alerts) or by various systems of the vehicle (e.g., to allow or limit functionality of driver assistance or autonomous driving systems and/or autonomously control certain operations of the vehicle for safety purposes (e.g., apply the brakes)).

However, current DMSs may be unable to report the attention state of the driver in certain situations such as, but not limited to, the driver's hands blocking the camera while steering the vehicle, driver abuse (e.g., the driver intentionally blocking the camera), sun glare, the steering wheel blocking the camera, etc. In these situations, determination of the driver's attentiveness and decisions regarding starting or delaying an escalation of the DMSs can be challenging. Current DMSs typically treat these "unknown" situations in a manner identical to a detection of an inattentive driver, resulting in, for example, alerts/notifications/warnings to the driver, loss of functionality, and/or autonomous control of the vehicle. However, in situations wherein the driver is actually paying attention to the road, such escalations may be unnecessary.

Accordingly, it is desirable to provide systems and/or methods capable of improving a response of a DMS when the DMS is unable to assess a state of a driver. Furthermore, other desirable features and characteristics of the present invention will become apparent from the subsequent detailed description and the appended claims, taken in conjunction with the accompanying drawings and the foregoing technical field and background.

SUMMARY

A system is provided for improving a Driver Monitoring System (DMS) of a vehicle. In one embodiment, the system includes a controller in operable communication with the DMS of the vehicle. The controller is configured to, by a processor: receive a signal from the DMS that a camera of the DMS is unable to monitor a driver of the vehicle, determine a cause of the camera being unable to monitor the driver, and adjust an escalation algorithm of the DMS based on the determined cause of the camera being unable to monitor the driver. The escalation algorithm is configured to perform actions based on activity of the driver.

In various embodiments, the controller is configured to, by the processor, modify one or more systems of the vehicle to mitigate the cause of the camera being unable to monitor the driver.

In various embodiments, the controller is configured to, by the processor, determine a probability that the cause of the camera not being able to monitor the driver is due to sun glare. In various embodiments, the controller is configured to, by the processor, adjust a tint of a sunroof of the vehicle or close a retractable panel of the vehicle over the sunroof to reduce the sun glare when the probability that the cause is due to sun glare exceeds a sun glare threshold. In various embodiments, the controller is configured to, by the processor, generate an alert to notify the driver that the camera cannot monitor the driver when the probability that the cause is due to sun glare exceeds a sun glare threshold.

In various embodiments, the controller is configured to, by the processor, determine a probability that the cause of the camera not being able to monitor the driver is due to the camera being blocked by a steering wheel of the vehicle. In various embodiments, the controller is configured to, by the processor, adjust a steering wheel ratio of a steer by wire system of the vehicle when the probability that the cause is due to the camera being blocked by the steering wheel exceeds a steering wheel angle threshold. In various embodiments, the controller is configured to, by the processor, generate an alert to notify the driver that the camera cannot monitor the driver when the probability that the cause is due to the camera being blocked by the steering wheel exceeds a steering wheel angle threshold.

In various embodiments, the controller is configured to, by the processor: determine a probability that the cause of the camera not being able to monitor the driver is due to the driver holding the steering wheel in a manner such that a hand of the driver is blocking the camera, and generate an alert to notify the driver to adjust the hand on the steering wheel when the probability that the cause is due to the camera being blocked by the hand exceeds a hand position threshold.

In various embodiments, the controller is configured to, by the processor: analyze activity of the driver, as monitored by the camera of the DMS, over a period of time, determine a driving score assigned to the driver representative of the activity, and adjust the escalation algorithm of the DMS based on the driver's score.

A method is provided for improving a Driver Monitoring System (DMS) of a vehicle. In one embodiment, the method includes, by a processor: receiving a signal from the DMS of the vehicle that a camera of the DMS is unable to monitor a driver of the vehicle, determining a cause of the camera being unable to monitor the driver, and adjusting an escalation algorithm of the DMS based on the determined cause of the camera being unable to monitor the driver, wherein the escalation algorithm is configured to perform actions based on activity of the driver.

In various embodiments, the method includes, by the processor: modifying one or more systems of the vehicle to mitigate the cause of the camera being unable to monitor the driver.

In various embodiments, the method includes, by the processor: determining a probability that the cause of the camera not being able to monitor the driver is due to sun glare. In various embodiments, the method includes, by the processor: adjusting a tint of a sunroof of the vehicle or closing a retractable panel of the vehicle over the sunroof to reduce the sun glare when the probability that the cause is due to sun glare exceeds a sun glare threshold. In various embodiments, the method includes, by the processor: generating an alert to notify the driver that the camera cannot monitor the driver when the probability that the cause is due to sun glare exceeds a sun glare threshold.

In various embodiments, the method includes, by the processor: determining a probability that the cause of the camera not being able to monitor the driver is due to the camera being blocked by a steering wheel of the vehicle. In various embodiments, the method includes, by the processor: adjusting a steering wheel ratio of a steer by wire system of the vehicle when the probability that the cause is due to the camera being blocked by the steering wheel exceeds a steering wheel angle threshold. In various embodiments, the method includes, by the processor: generating an alert to notify the driver that the camera cannot monitor the driver when the probability that the cause is due to the camera being blocked by the steering wheel exceeds a steering wheel angle threshold.

In various embodiments, the method includes, by the processor: determining a probability that the cause of the camera not being able to monitor the driver is due to the driver holding the steering wheel in a manner such that a hand of the driver is blocking the camera, and generating an alert to notify the driver to adjust the hand on the steering wheel when the probability that the cause is due to the camera being blocked by the hand exceeds a hand position threshold.

In various embodiments, the method includes, by the processor: analyzing activity of the driver, as monitored by the camera of the DMS, over a period of time, determining a driving score assigned to the driver representative of the activity, and adjusting the escalation algorithm of the DMS based on the driver's score.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
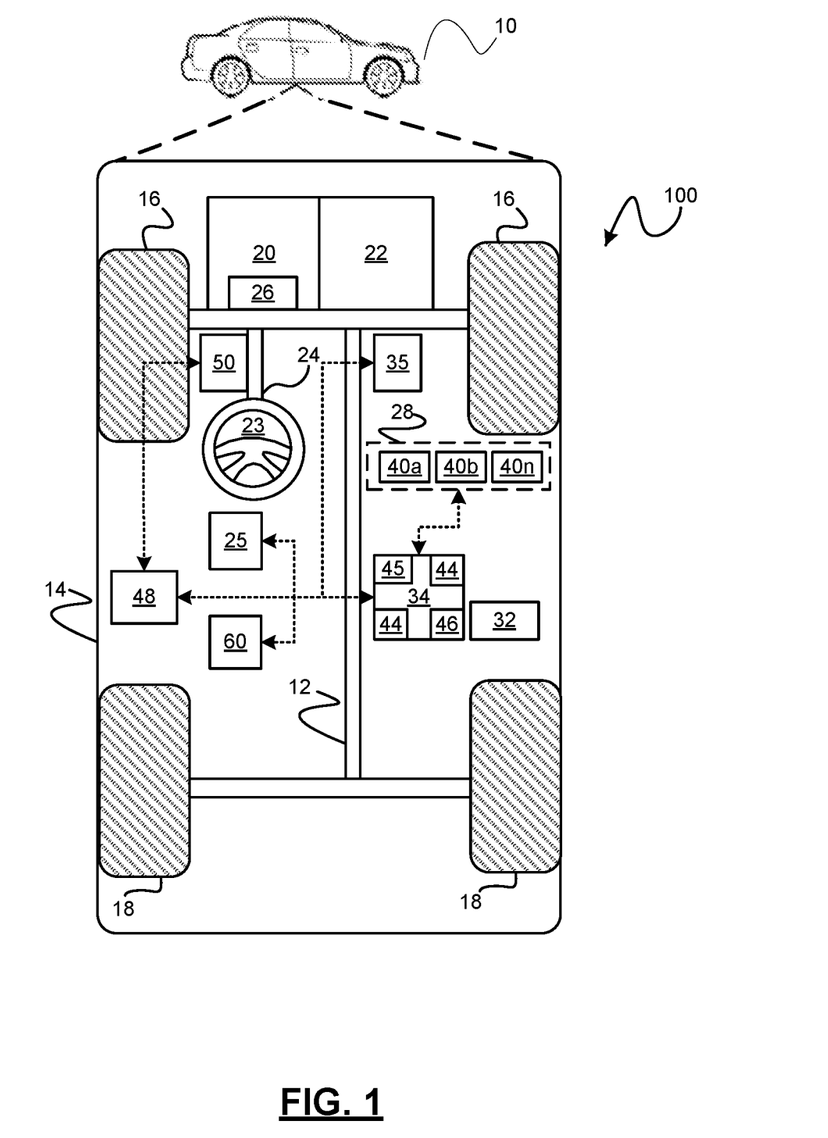
FIG. 1 is a functional block diagram of a vehicle that includes a driver monitoring adjustment system, in accordance with various embodiments.

FIG. 1 illustrates a vehicle 10, according to an exemplary embodiment. In certain embodiments, the vehicle 10 comprises an automobile. In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In addition, in various embodiments, it will also be appreciated that the vehicle 10 may comprise any number of other types of mobile platforms.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, a transmission system 22, a steering system 24, a sensor system 28, at least one data storage device 32, at least one controller 34, and a display system 35, and a driver monitoring system 48. The propulsion system 20 includes an engine 26, such as a gasoline or diesel fueled combustion engine, or an electric engine. The transmission system 22 is configured to transmit power from the propulsion system 20 to the wheels 16-18 according to selectable speed ratios.

According to various embodiments, the transmission system 22 may include a step-ratio automatic transmission, a continuously-variable transmission, or other appropriate transmission.

The steering system 24 influences a position of the wheels 16-18. While depicted as including a steering wheel 23 for illustrative purposes, in some embodiments contemplated within the scope of the present disclosure, the steering system 24 may not include the steering wheel 23. Unlike conventional steering systems, the steering wheel 23 is not mechanically coupled to the front wheels 16. Instead, the steering system 24 includes a steer by wire system 25 that functionally couples the steering wheel 23 to systems (e.g., actuators) configured to turn the front wheels 16 with electrical cables configured to transmit electronic signals. The steer by wire system 25 may be adjusted to modify a steering ratio between the steering wheel 23 and the turning radius of the front wheels 16.

The sensor system 28 includes one or more sensing devices 40a-40n that sense observable conditions of the exterior and/or interior environment of the vehicle and/or of the vehicle itself. The sensing devices 40a-40n can include, but are not limited to, radars, lidars, global positioning systems, optical cameras, thermal cameras, ultrasonic sensors, inertial measurement units, pressure sensors, position sensors, speed sensors, and/or other sensors.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The data storage device 32 can be any suitable type of storage apparatus, including various different types of direct access storage and/or other memory devices. In one exemplary embodiment, the data storage device 32 comprises a program product from which a computer readable memory device can receive a program that executes one or more embodiments of one or more processes of the present disclosure, such as the steps of the process discussed further below in connection with FIG. 3. In another exemplary embodiment, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate data.

In various embodiments, the instructions, when executed by the processor 44, generally process received data in order to determine a cause of a blockage of the camera 50, adjust an escalation algorithm of the DMS 48 based on the determined cause of the blockage, and, in some embodiments, mitigate the cause of the blockage as further described with respect to the FIGS. 2-5. As such, the vehicle 10 includes a driver monitoring adjustment system 100 configured to interact with the DMS 48 and improve functionality thereof and/or communication between the DMS 48 and the driver. In various embodiments, the driver monitoring adjustment system 100 may include the controller 34, the DMS 48, and/or an entirety of the vehicle 10.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems. In various embodiments, the controller 34 may be a component of the DMS 48.

The DMS 48 may include various controllers, memory devices, data storage devices, sensors, etc. that in combination are configured to monitor a driver of the vehicle 10 and continuously or periodically generate an assessment of the attentiveness of the driver during operation of the vehicle 10. In this example, the DMS 48 includes a camera 50 configured to observe the driver, for example, the driver's face. Such observations are used by the DMS 48, at least in part, for generating the assessment of the driver.

The vehicle 10 further includes a sunroof 60, that is, a panel on the roof of the vehicle 10 that allows light to enter the vehicle 10. The sunroof 60 includes a "smart" glass that incorporates a suspended particle device technology to allow for adjustment of opacity between translucent and opaque. Specifically, a user is able to adjust a tint of the sunroof with controls in the vehicle 10. Interaction with the controls selectively apply an electrical voltage to a thin film on the glass causing a corresponding change in transmissivity thereof via alignment and misalignment of nanoparticles of the thin film (e.g., polyiodide nanoparticles). The transmissivity of the sunroof may be adjusted over an entirety thereof and/or limited to individual portions or sections thereof. The vehicle 10 may further include an opaque, retractable panel configured to selectively slide over and cover the sunroof 60.

Figure 2:
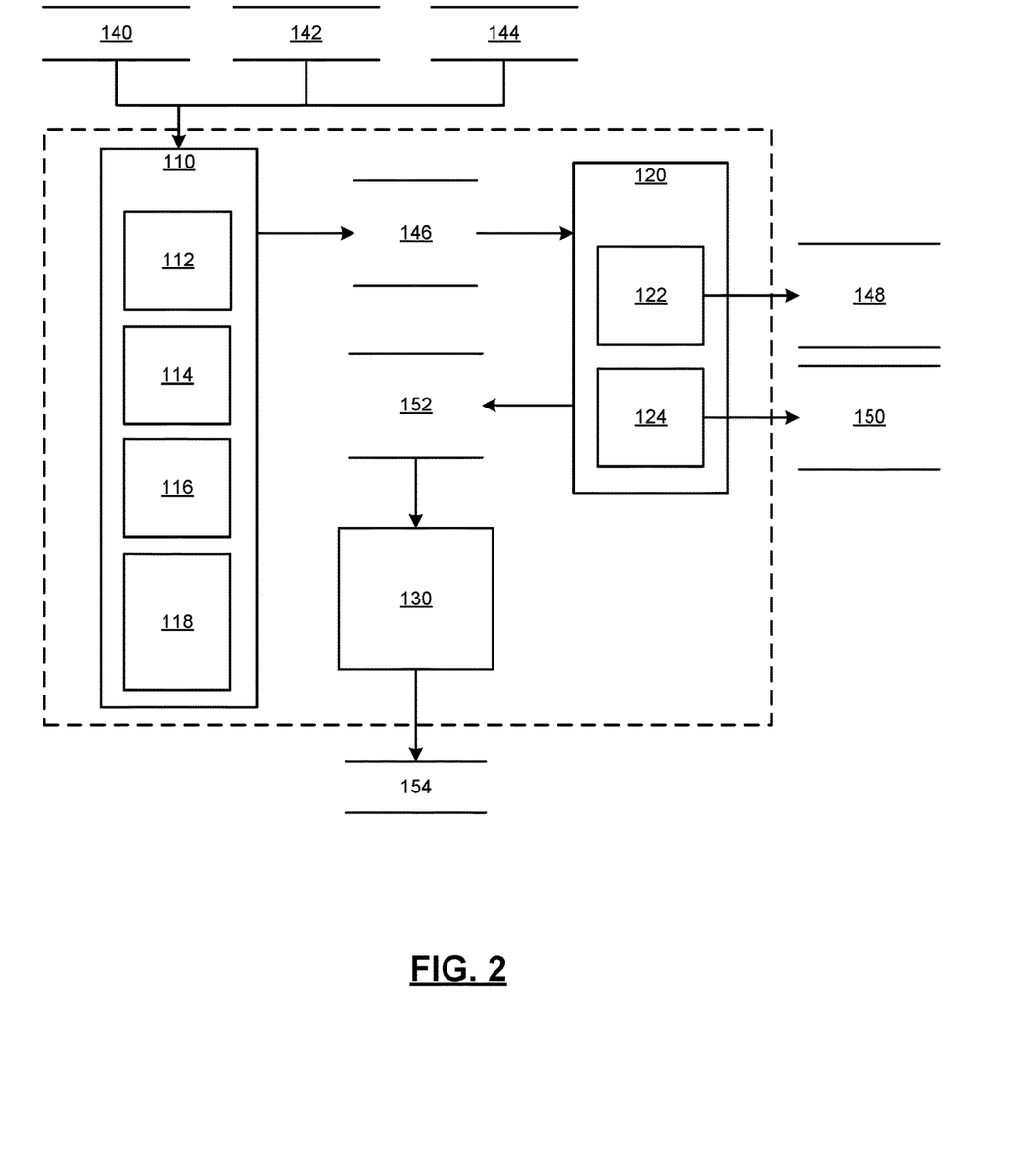
FIG. 2 is a dataflow diagram illustrating elements of the driver monitoring adjustment system of the vehicle of FIG. 1, in accordance with various embodiments.

With reference to FIG. 2 and with continued reference to FIG. 1, a dataflow diagram illustrates elements of the driver monitoring adjustment system 100 of FIG. 1 in accordance with various embodiments. As can be appreciated, various embodiments of the system 100 according to the present disclosure may include any number of modules embedded within the controller 34 which may be combined and/or further partitioned to similarly implement systems and methods described herein. Furthermore, inputs to the system 100 may be received from other control modules (not shown) associated with the vehicle 10, and/or determined/modeled by other sub-modules (not shown) within the controller 34. Furthermore, the inputs might also be subjected to preprocessing, such as sub-sampling, noise-reduction, normalization, feature-extraction, missing data reduction, and the like. In various embodiments, the system 100 includes an analysis module 110, a mitigation module 120, and an escalation module 130.

In various embodiments, the analysis module 110 receives as input sensor data 140 generated by the sensor system 28, temporal and location data 142 stored in the data storage device 32, and/or DMS data 144 generated by the DMS 48. The sensor data 140 includes various data indicating observable conditions of the exterior and/or interior environment of the vehicle 10 and/or of the vehicle 10 itself. In various embodiments, the sensor data 140 includes light intensity measurements generated by a brightness sensor, pressure measurements generated by a touch sensor, and/or a location and/or a trajectory of the vehicle 10 generated by a global positioning system (GPS) device. The temporal and location data 142 includes various data indicating a time of year (e.g., date) and a time of day. The DMS data 144 includes various data indicating that the DMS 48 is unable to determine an attention state of the driver due to the camera 50 being unable to monitor the driver of the vehicle 10 (referred to herein as an unknown attention state), and, optionally, attention states of the driver over a period of time as determined by the DMS 48.

The analysis module 110 performs an analysis of the received data to determine a likely cause of the camera 50 being unable to monitor the driver of the vehicle 10. In various embodiments, the analysis module 10 includes a driver score submodule 112, a sun glare submodule 114, a hand position submodule 116, and a steering wheel position submodule 118.

Figure 3:
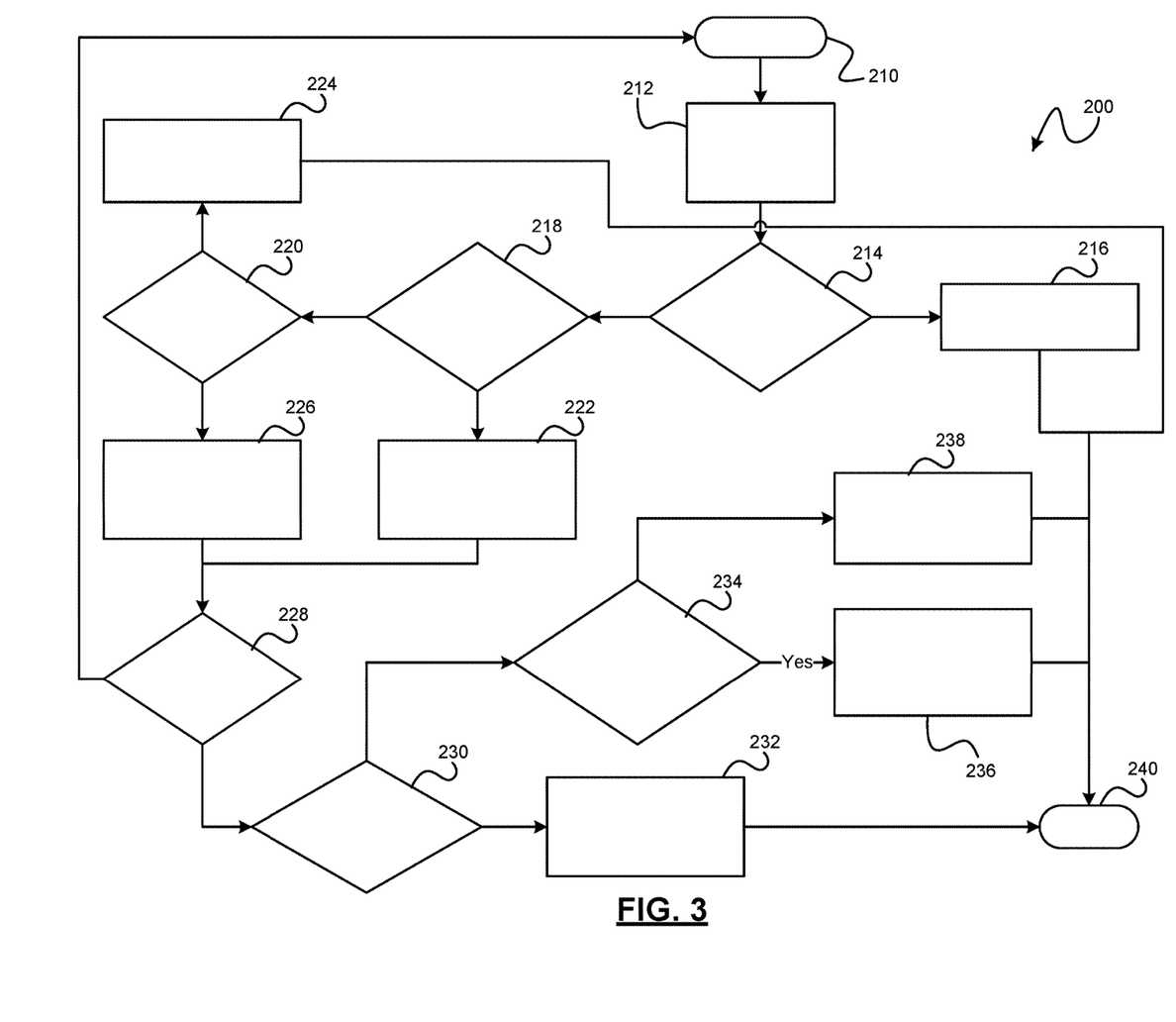
FIG. 3 is a flowchart of a process for improving responses of a driver monitoring system of FIG. 1 as performed by the driver monitoring adjustment system of the vehicle of FIGS. 1 and 2, in accordance with exemplary embodiments.
Figure 4:
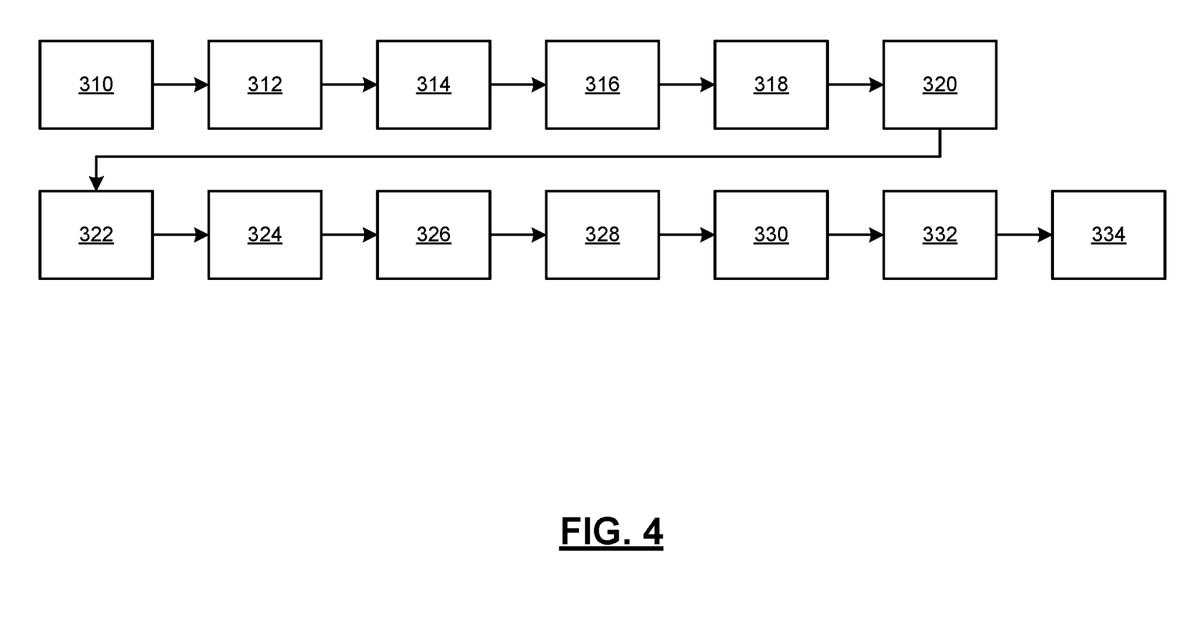
FIG. 4 includes a sequence of driver attention states as determined by the driver monitoring adjustment system of the vehicle of FIGS. 1 and 2 in accordance with exemplary embodiments.
Figure 5:
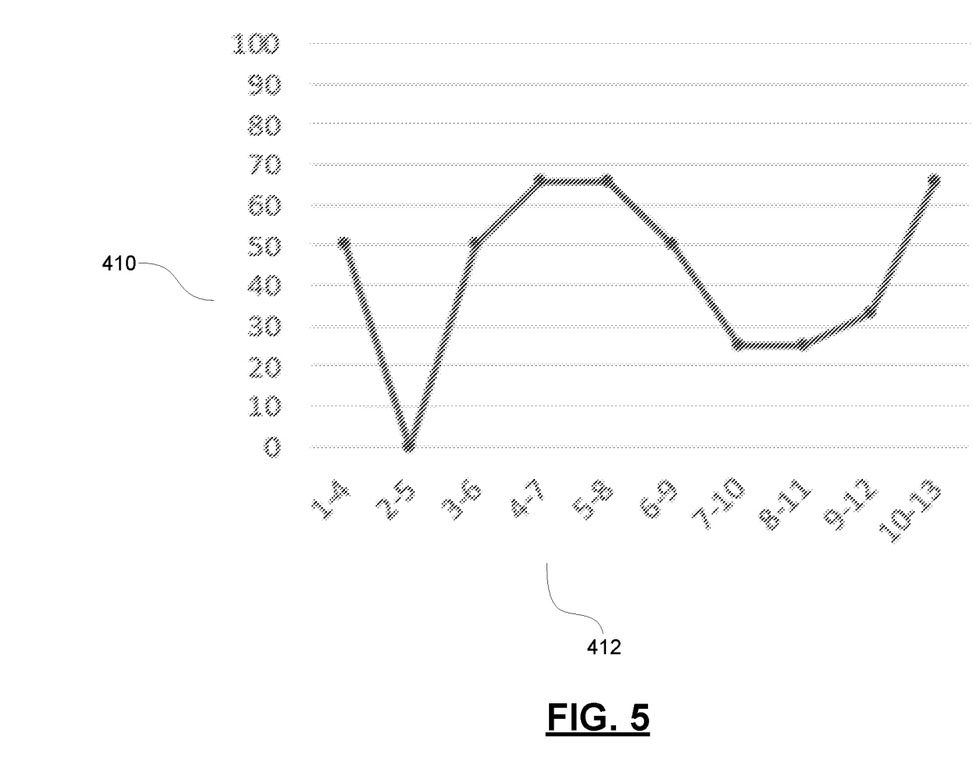
FIG. 5 includes a graph illustrating a method for determining a driver's score based on the sequence of driver attention states of FIG. 4 in accordance with exemplary embodiments.

In various embodiments, the driver score submodule 112 may analyze the sensor data 140, the temporal and location data 142, and/or the DMS data 144 to determine a driver's score to be attributed to the driver of the vehicle 10. This driver's score may be used at a given time in determining whether to begin or proceed with escalation of the DMS 48. FIGS. 3 and 4 illustrate an exemplary process for determining the driver's score. In this example (FIG. 3), the DMS data 144 provides a sequence of determined attention states (i.e., 310-334) that include "On Road" indicating that the driver is attentive, "Off Road" indicating that the driver is inattentive, and "Unknown" indicating that the DMS 48 is unable to determine the attentive state of the driver. In this example, the driver's score is determined using equation (1) below.

$$D_S(t) = \frac{X}{Y - Z} \times 100 \qquad (1)$$

Wherein Ds is the driver's score, "X" is the total number of On Road attention states in the sequence at time (t), "Y" is the total number of attention states in the sequence at time (t), and "Z" is the total number of Unknown attention states in the sequence at time (t). FIG. 5 presents a graph that shows the determined driver's score at various times (t) based on the previously recorded attention states in the sequence. The graph includes the driver's scores on the y-axis (labeled as 410) and the times (t) on the x-axis (labeled as 412). The sequence includes On Road attention states at 310, 320, 322, 330, and 334, Off Road attention states at 316, 320, 324, 326, and 328, and Unknown attention states at 312, 314, 318, and 332 for a total of thirteen attention states in the sequence. Each of the calculated driver's scores Ds are determined based on four of the attention states.

At a first data point on the graph, the first four attention states 310-316 are used in equation 1 to result in a Ds=50. The second data point on the graph inputs the second through fifth attention states 312-318 into equation 1 to result in a Ds=0. This process is continued to calculate the remaining data points.

In various embodiments, the sun glare submodule 114 may analyze the sensor data 140, the temporal and location data 142, and/or the DMS data 144 to determine a probability of the cause of the camera 50 being unable to monitor the driver being due to sun glare. In various embodiments, the sun glare submodule 114 may analyze the location of the vehicle 10, the date, the time of day, the trajectory of the vehicle 10, sensed ambient light levels (e.g., intensity), and/or weather information to determine the probability that sun glare is interfering with the camera 50. For example, the sun glare submodule 114 may determine an absolute position of the sun based on the date, time, and location of the vehicle 10. The position of the sun may then be determined in relation to the vehicle 10 based on, for example, the trajectory of the vehicle 10. Various factors such as the sensed ambient light levels, the weather information, and the transmissibility of the sunroof 60 may be used to determine the predicted light level at the location of the camera 50 which may then be used to determine a probability that the cause of the camera 50 being unable to monitor the driver is due to sun glare. During this determination, the relative azimuth and elevation angles of the sun in combination with the structure of the vehicle 10 may be considered to determine a normalized light level at a specific position (e.g., at the camera 50).

In various embodiments, the hand position submodule 116 may analyze the sensor data 140, the temporal and location data 142, and/or the DMS data 144 to determine positions of the driver's hands on the steering wheel and a probability of the cause of the camera 50 being unable to monitor the driver being due to the driver's hand covering the camera 50. In various embodiments, the hand position submodule 116 may analyze the steering wheel angle, and states of touch zones of the steering wheel to determine the probability that the driver's hands are blocking the camera 50.

In various embodiments, the steering wheel position submodule 118 may analyze the sensor data 140, the temporal and location data 142, and/or the DMS data 144 to determine the steering wheel angle and, in combination with the structure of the steering wheel and the position of the camera 50, determine a probability of the steering wheel blocking the camera 50.

In various embodiments, the mitigation module 120 receives as input analysis data 146 generated by the analysis module 110. The analysis data 146 includes various data indicating a determination by the analysis module 110 as to the likely cause of the camera 50 being unable to monitor the driver. In various embodiments, the analysis data 146 may include probabilities corresponding to various possible causes of the camera 50 being unable to monitor the driver such as, but not limited to, probabilities of the cause being due to sun glare, hand position of the driver on the steering wheel, and/or the position of the steering wheel. In various embodiments, the analysis data 146 may include the driver score.

The mitigation module 120 performs modification, if possible, to settings of one or more systems of the vehicle 10 to mitigate the cause of the camera 50 being unable to monitor the driver. In various embodiments, the mitigation module 120 includes a sunroof submodule 122 and a steering wheel submodule 124.

If the vehicle 10 includes a smart sunroof (e.g., sunroof 60) capable of adjusting a tint thereof (e.g., shading, transmissivity, etc.) and/or controlling operation of a retractable panel configured to selectively slide over and cover the sunroof 60, and the probability of the cause of the camera 50 being unable to monitor the driver being due to sun glare exceeds a sun glare threshold, the sunroof submodule 122 may generate sunroof control data 148 that includes instructions configured to cause the sunroof 60 to adjust the tint thereof, either for an entirety of the sunroof 60 or at least a portion thereof. For example, the sunroof control data 148 may initiate an electronic signal to be sent to the sunroof 60 that causes nanoparticles therein to misalign and thereby block incoming sunlight. In this manner, the system 100 may be able to mitigate the sun glare and thereby allow the DMS 48 to monitor the driver. In addition, or as an alternative, the sunroof control data 148 may include instructions configured to cause the retractable panel to entirely or partially cover the sunroof 60.

If the vehicle 10 includes a steer by wire system (e.g., the steer by wire system 25), and the probability of the cause of the camera 50 being unable to monitor the driver being due to the steering wheel blocking the camera 50 exceeds a steering wheel angle threshold, the steering wheel submodule 124 may generate steering wheel control data 150 that includes instructions configured to cause an adjustment to the steering wheel steering ratio to avoid blocking the camera 50 and thereby allow the DMS 48 to monitor the driver. In some embodiments, the steering wheel submodule 124 may analyze a planned route for the vehicle 10 or a road on which the vehicle 10 is traveling and continuously adjust the steering wheel steering ratio to prevent or reduce the likelihood of the steering wheel blocking the camera 50 in upcoming turns.

In various embodiments, the escalation module 130 receives as input mitigation data 152 generated by the mitigation module 120. The mitigation data 152 includes various data indicating whether the mitigation module 120 was able to successfully perform actions to mitigate for the cause of the camera 50 being unable to monitor the driver.

Upon a determination that the mitigation module 120 was unable to perform mitigating actions, or the mitigating actions performed failed to allow the camera 50 to monitor the driver, the escalation module 130 may generate escalation data 154 that includes instructions for the DMS 48 to adjust an escalation algorithm of the DMS 48 and/or for the DMS 48 to generate one or more alerts for the driver based on the determined cause of the camera 50 being unable to monitor the driver. Such escalation algorithm may be configured to perform actions based on activity of the driver, such as generating alerts that indicate instructions or notifications for the driver and/or modifying operation of the vehicle 10. In various embodiments, the alert(s) may be rendered on the display system 35.

With reference now to FIG. 3 and with continued reference to FIGS. 1-2, a flowchart provides a method 200 for improving the DMS 48 as performed by the system 100, in accordance with exemplary embodiments. As can be appreciated in light of the disclosure, the order of operation within the method 200 is not limited to the sequential execution as illustrated in FIG. 3, but may be performed in one or more varying orders as applicable and in accordance with the present disclosure. In various embodiments, the method 200 can be scheduled to run based on one or more predetermined events, and/or can run continuously during operation of the vehicle 10.

In one example, the method 200 may start at 210. The method 200 includes determining, at 212, a likely cause of the camera 50 being unable to monitor the driver of the vehicle 10. In various embodiments, the determination may include producing probabilities of various likely causes such as, but not limited to, sun glare, blocking of the camera 50 by the steering wheel, and blocking of the camera 50 by a hand of the driver. If the vehicle 10 includes a smart sunroof, a determined probability of the cause being due to sun glare is compared, at 214, to a sun glare threshold. If the sun glare probability exceeds the sun glare threshold, the method 200 includes adjusting, at 216, a transmittance of the sunroof.

If the vehicle 10 does not include a smart sunroof, or the sun glare probability is below the sun glare threshold, the method 200 includes comparing a determined probability of the cause being due to the position of the steering wheel is compared, at 218, to a steering wheel angle threshold. If the steering wheel probability exceeds the steering wheel angle threshold at 218, and the vehicle 10 includes a steer by wire system as determined at 220, the method 200 includes adjusting, at 224, a steering wheel ratio such that the steering wheel does not block the camera 50.

If the steering wheel probability is below the steering wheel angle threshold at 218, the method 200 includes adjusting, at 222, parameters of the escalation algorithm of the DMS 48. If the vehicle 10 does not include a steer by wire system as determined at 220, the method 200 includes adjusting, at 226, pre-escalation parameters of the DMS 48.

At 228, the method 200 includes determining whether, based on the escalation algorithm, escalation should begin or proceed. If a determination is made that escalation should not begin or proceed, the method 200 may return to the start at 210. In various embodiments, the determination as to whether the escalation should begin or proceed may include a consideration of the driver's score (e.g., as determined by the driver score submodule 112). For example, a high driver's score (i.e., a typically attentive driver) may be consideration for delaying escalation, whereas a poor driver's score (i.e., a typically inattentive driver) may be consideration for accelerating the escalation process.

If a determination is made that escalation should begin or proceed, the method 200 includes comparing, at 230, a probability of the cause of the camera 50 being unable to monitor the driver being due to a position of a hand of the driver to a hand position threshold. If the hand position probability exceeds the hand position threshold, the method 200 includes generating, at 232, a notification for the driver to reposition the hand such that the camera 50 is not blocked thereby.

If the hand position probability is below the hand position threshold, the method 200 includes comparing, at 234, probabilities that the cause of the camera 50 being unable to monitor the driver being due to the position of the steering wheel or sun glare. If the steering wheel position probability exceeds the steering wheel angle threshold or if the sun glare probability exceeds the sun glare threshold, the method 200 includes generating, at 236, a notification for the driver that the camera 50 is unable to monitor the driver. If the steering wheel position probability is below the steering wheel angle threshold and the sun glare probability is below the sun glare threshold, the method 200 includes generating, at 236, a notification for the driver to pay attention to the road. Once a mitigation action has been performed (i.e., at 216 or 224) and/or a notification generated (i.e., at 232, 236, or 238), the method 200 may end at 240.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system, comprising:
 a controller in operable communication with a Driver Monitoring System (DMS) of a vehicle, the controller configured to, by a processor:
  receive a signal from the DMS that a camera of the DMS is unable to monitor a driver of the vehicle;
  determine a cause of the camera being unable to monitor the driver; and
  modify one or more systems of the vehicle to mitigate the cause of the camera being unable to monitor the driver.

2. The system of claim 1, wherein the controller is configured to, by the processor, determine a probability that the cause of the camera not being able to monitor the driver is due to sun glare.

3. The system of claim 2, wherein the controller is configured to, by the processor, adjust a tint of a sunroof of the vehicle or close a retractable panel of the vehicle over the sunroof to reduce the sun glare when the probability that the cause is due to the sun glare exceeds a sun glare threshold.

4. The system of claim 2, wherein the controller is configured to, by the processor, generate an alert to notify the driver that the camera cannot monitor the driver when the probability that the cause is due to the sun glare exceeds a sun glare threshold.

5. The system of claim 1, wherein the controller is configured to, by the processor, determine a probability that the cause of the camera not being able to monitor the driver is due to the camera being blocked by a steering wheel of the vehicle.

6. The system of claim 5, wherein the controller is configured to, by the processor, adjust a steering wheel ratio of a steer by wire system of the vehicle when the probability that the cause is due to the camera being blocked by the steering wheel exceeds a steering wheel angle threshold.

7. The system of claim 5, wherein the controller is configured to, by the processor, generate an alert to notify the driver that the camera cannot monitor the driver when the probability that the cause is due to the camera being blocked by the steering wheel exceeds a steering wheel angle threshold.

8. The system of claim 1, wherein the controller is configured to, by the processor:
 determine a probability that the cause of the camera not being able to monitor the driver is due to the driver holding a steering wheel in a manner such that a hand of the driver is blocking the camera; and
 generate an alert to notify the driver to adjust the hand on the steering wheel when the probability that the cause is due to the camera being blocked by the hand exceeds a hand position threshold.

9. The system of claim 1, wherein the controller is configured to, by the processor:
 analyze activity of the driver, as monitored by the camera of the DMS, over a period of time;
 determine a driver's score assigned to the driver representative of the activity; and
 adjust an escalation algorithm of the DMS based on the driver's score.

10. The system of claim 9, wherein the controller is configured to, by the processor, generate an alert to notify the driver that the camera cannot monitor the driver in response to the controller adjusting the escalation algorithm based on the driver's score.

11. A method, comprising:
 receiving, by a processor, a signal from a Driver Monitoring System (DMS) of a vehicle that a camera of the DMS is unable to monitor a driver of the vehicle;
 determining, by the processor, a cause of the camera being unable to monitor the driver; and
 modifying, by the processor, one or more systems of the vehicle to mitigate the cause of the camera being unable to monitor the driver.

12. The method of claim 11, further comprising determining, by the processor, a probability that the cause of the camera not being able to monitor the driver is due to sun glare.

13. The method of claim 12, further comprising adjusting, by the processor, a tint of a sunroof of the vehicle or closing a retractable panel of the vehicle over the sunroof to reduce the sun glare when the probability that the cause is due to the sun glare exceeds a sun glare threshold.

14. The method of claim 12, further comprising generating, by the processor, an alert to notify the driver that the camera cannot monitor the driver when the probability that the cause is due to the sun glare exceeds a sun glare threshold.

15. The method of claim 11, further comprising determining, by the processor, a probability that the cause of the camera not being able to monitor the driver is due to the camera being blocked by a steering wheel of the vehicle.

16. The method of claim 15, further comprising adjusting, by the processor, a steering wheel ratio of a steer by wire system of the vehicle when the probability that the cause is due to the camera being blocked by the steering wheel exceeds a steering wheel angle threshold.

17. The method of claim 15, further comprising generating, by the processor, an alert to notify the driver that the camera cannot monitor the driver when the probability that the cause is due to the camera being blocked by the steering wheel exceeds a steering wheel angle threshold.

18. The method of claim 11, further comprising:
determining, by the processor, a probability that the cause of the camera not being able to monitor the driver is due to the driver holding a steering wheel in a manner such that a hand of the driver is blocking the camera; and
generating, by the processor, an alert to notify the driver to adjust the hand on the steering wheel when the probability that the cause is due to the camera being blocked by the hand exceeds a hand position threshold.

19. The method of claim 11, further comprising, by the processor:
analyzing activity of the driver, as monitored by the camera of the DMS, over a period of time;
determining a driver's score assigned to the driver representative of the activity; and
adjusting an escalation algorithm of the DMS based on the driver's score.

20. The method of claim 19, further comprising generating an alert to notify the driver that the camera cannot monitor the driver in response to adjusting the escalation algorithm based on the driver's score.

\* \* \* \* \*